United States Patent [19]

Dahlgren

[11] Patent Number: 4,883,337

[45] Date of Patent: Nov. 28, 1989

[54] LOW STRAIN OPTICAL FIBER COIL

[75] Inventor: Robert P. Dahlgren, Somerville, Mass.

[73] Assignee: The Charles Stark Draper Laboratory, Inc., Boston, Mass.

[21] Appl. No.: 237,779

[22] Filed: Aug. 29, 1988

[51] Int. Cl.$^4$ ................................................ G02B 6/02
[52] U.S. Cl. ............................. 350/96.29; 242/4 BE; 242/47; 242/174; 350/96.10; 356/350
[58] Field of Search ............... 350/96.10, 96.15, 96.24, 350/96.29, 320; 356/350, 351; 242/1, 4 BE, 7.01, 47, 159, 163, 168, 174, DIG. 3

[56] References Cited

U.S. PATENT DOCUMENTS

| | | | |
|---|---|---|---|
| 4,163,911 | 8/1979 | Simes et al. | 310/27 |
| 4,408,378 | 10/1983 | Ketteringham et al. | 242/47 X |
| 4,699,451 | 10/1987 | Mohr | 350/96.15 |
| 4,743,115 | 5/1988 | Arditty et al. | 356/350 |
| 4,768,856 | 9/1988 | Hofmann et al. | 350/96.10 X |
| 4,781,461 | 11/1988 | Baron et al. | 356/350 |
| 4,793,708 | 12/1988 | Bednarz | 356/350 |
| 4,802,731 | 2/1989 | Maschek et al. | 350/96.23 |

Primary Examiner—John D. Lee
Attorney, Agent, or Firm—Lahive & Cockfield

[57] ABSTRACT

An optical fiber coil is formed by winding successive loops of a fiber in a toroidal helix to form a self-supporting ring. No coilform or adhesives are necessary, resulting in relaxed boundary conditions at the outside of the fiber jacket, and in an overall reduction of thermally-induced strain, as compared to existing coil constructions. One low-stress mounting includes a trellis or spoke-like frame structure which frictionally supports the coil about its circumference. Another mounting includes a bouyant bead support structure. In a third mounting, a filament suspends the coil from a frame. The coil may be suspended within an isothermal enclosure to further reduce thermal effects.

20 Claims, 3 Drawing Sheets

LOW STRAIN OPTICAL FIBER COIL

BACKGROUND OF THE INVENTION

Optical fibers are used for form precisely defined or fixed optical paths for the propagation of coherent light in a number of measurement instruments, to develop signals indicative of a quantity which it is desired to measure, such as rotation or acceleration. The variation in some characteristic influenced by the physical quantity will depend in a direct manner on the length of the fiber, the number of turns in a coil, or the like. The construction of a sensitive instrument therefore commonly utilizes a fiber wound in a multi-turn coil. Various design constraints, such as limitations on permissible bending stresses in the fiber, light attenuation and the like, result in coil constructions which may consist of a fiber tens or many hundreds of meters long, wound into a coil of perhaps five to ten centimeters diameter.

In the prior art, such coils are made by winding many turns of an optical fiber about a spindle or other coilform, essentially forming a fiber spool. A principal design constraint in this type of construction is that the coilform must not introduce stresses into the fiber, since stresses can cause signal attenuation, polarization loss, or other deleterious effects.

When a twenty meter length of fiber is cooled to the temperature of liquid nitrogen, it shrinks by several millimeters. In the prior art constructions, if this shrinkage is not accommodated by corresponding changes of coilform dimensions, great stresses can build up in the fiber, leading to degradation of instrument parameters. Consequently, coilforms have been designed of materials with thermal constants selected to minimize differential thermal expansion between the coilform and the coiled fiber. Among the materials which have been used for coilforms are titanium, ceramics, aluminum, polycarbonate plastics and exotic carbon composites. An adhesive or potting material is also generally used in the completed coil assembly, and such adhesives or potting materials must also be selected to minimize the introduction of unwanted thermal effects.

To optimize the coil design for extreme temperature changes, however, is not a simple problem. The fibers themselves do not constitute a homogeneous structure, but utilize extremely dissimilar materials for the central light path component, i.e., the core and cladding which are generally formed of fused silica, and for the outer protective jacket, which is generally formed of one or more polymer layers. The thermal expansion properties of the fiber are thus those of a multi-component mechanical system, rather than of a bulk material. In addition, operation at cryogenic temperatures causes an increase of bending modulus in most fiber coatings, potting materials and adhesives, and this further increases stain due to microbending, introducing a concomitant degradation of fiber characteristics.

Considerable efforts have been made to develop thermal models for determining appropriate materials and structures for fiber/coilform assemblies to be able to operate predictably in the temperature range of $-200°$ C. to $+100°$ C. Accordingly, there is a need for a fiber coil with improved temperature dependent characteristics.

OBJECTS AND SUMMARY OF THE INVENTION

It is an object of the invention to provide an optical fiber coil having improved temperature characteristics.

It is another object of the invention to provide an optical fiber coil having a simplified mechanical structure and susceptible of thermal modeling of its essential characteristics.

It is another object of the invention to provide an optical fiber coil of simplified construction and repeatable operating characteristics.

These and other features are obtained in a coil which is formed by spirally winding successive loops of a fiber in a toroidal helix to form a self-supporting coil structure. No coilform or adhesives are necessary, resulting in minimally perturbed boundary conditions at the outside of the fiber jacket, and effecting an overall reduction of stresses under thermal extremes, as compared to existing coil constructions. One low-stress mounting mechanism includes a trellis or spoke-like frame structure which frictionally supports the coil at a plurality of discrete points about its circumference. Another low-stress mounting mechanism includes a bouyant bead support structure. A third mounting structure includes a filament suspension.

These and other features of the invention will be understood from the following detailed description, read in light of the background art and understood with reference to the illustrations of particular preferred embodiments.

DETAILED DESCRIPTION OF THE DRAWINGS

Figure 1A:
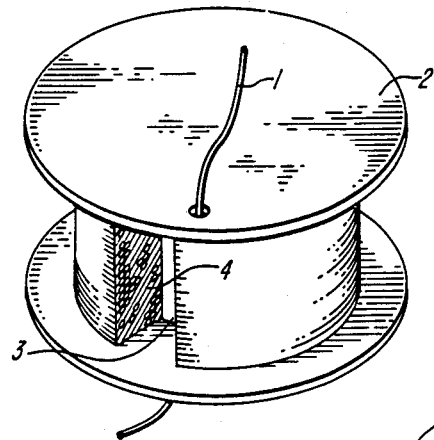
FIGS. 1A, 1B are partially cutaway perspective views of optical fiber coils of the prior art.
Figure 1B:
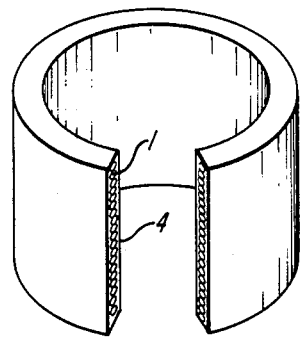

FIGS. 1A shows a prior art coil construction, wherein an optical fiber 1 is wound about a coilform 2 to form a regular array of circular windings, supported by a central cylindrical support region 3 of the coilform. As shown in cutaway, an adhesive 4 secures the fibers in position. Alternatively, adhesive 4 may be replaced by a potting medium, in which case the supporting coilform 2, 3 may be removed after the potting medium has set. FIG. 1B shows a corresponding view of a potted coil from which the coilform has been removed. In either case, it is a characteristic of these prior art constructions that the fiber coil is on or within a mechanically rigid structure, the coilform, the potting medium or both, which can give rise to stresses in the fiber under certain conditions such as differential thermal expansion or contraction as discussed above.

Figure 2A:
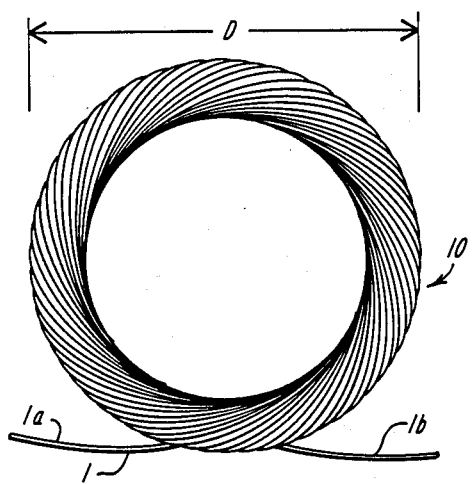
FIGS. 2A, 2B show face and side views of an optical fiber coil according to a preferred embodiment of the present invention.
Figure 2B:
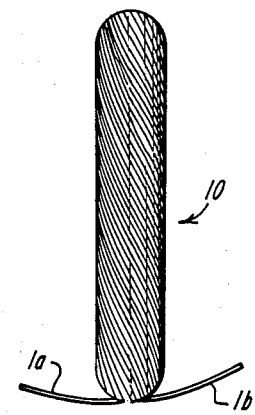

FIG. 2A is a view of a fiber coil 10 according to one embodiment of the present invention, wherein a fiber 1 is braided into a wreath to form a self supporting coil of a generally circular form. As illustrated, the coil is of a substantially toroidal or doughnut shape, with each individual winding following a helix around the body of the toroid as it moves progressively along a circumferential path of major diameter "D". FIG. 2B shows a side view of the coil 10 from within the nominal plane of the coil.

It will be appreciated by those familiar with optical fibers that a fiber has a stiffness or resistance to twisting and bending. Applicant has found that, by exercising reasonable care, a person may hand-wind a coil such as the coil of FIG. 2A without introducing twisting stresses. Accordingly, it will be understood that the winding of the coil illustrated in FIGS. 2A, 2B is effected carefully in order to progressively wind and wrap the fiber about its previously coiled loops, while leaving the fiber in a substantially unstressed position. That is, the twist introduced into the fiber is only the natural rotation of the fiber about its axis corresponding to the helical winding path.

As the fiber is wound, after a first loop is formed, each successive loop is formed by crossing the fiber a fixed number, e.g., M times, about the body of the coil for each full winding of the fiber around the major diameter D. For a coil with N loops, this produces a fiber ring with a spiral twist of $M(N-1)$. The ring is held together by the stiffness of the fiber, and resultant friction between the fibers, to form a self-supporting ring structure constituting a well defined optical path for light travelling between the fiber ends 1a, 1b.

Thus, a coil according to the present invention is constituted by a first untwisted loop, and a plurality of successive twisted loops which are wound together into a self-orienting coil with no external coilform. Such coil may also be formed with more than one untwisted initial winding, e.g., with a bundle of ten or twenty or more parallel untwisted windings constituting a ring upon which the final turns are wound in a helical winding path as previously described. In that case a ring of N loops, having P untwisted parallel windings and (N-P) outer windings each of twist M, produces a ring of twist (N-P)M. Such an embodiment may be preferred for instruments or environments where it is important to minimize the twist of the fiber.

Figure 3A:
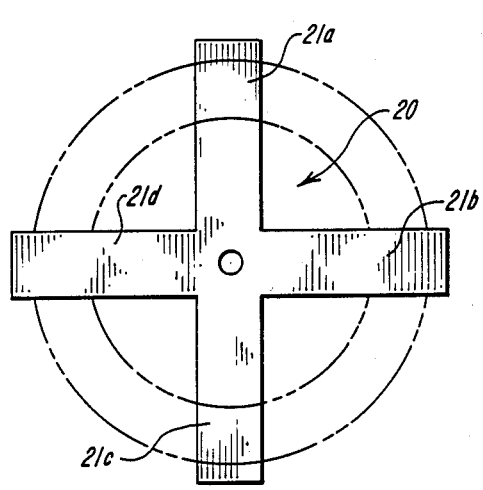
FIGS. 3A, 3B show corresponding views of the embodiment of FIGS. 2A, 2B on one proposed mounting structure.
Figure 3B:
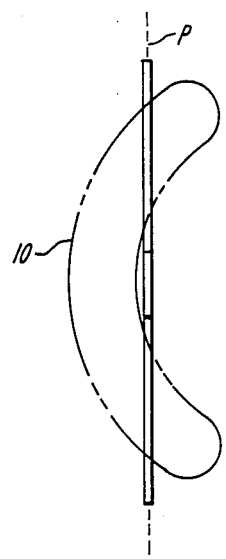

For use in an instrument, the ring is placed on a mounting which orients the ring in a nominal reference plane. One preferred embodiment of a mounting 20 is shown in FIGS. 3A, 3B. This mounting is a frictional mount, and thus implements principals related to those underlying the coil design.

The illustrated mounting 20 is a cross-shaped structure having arms 21a, 21b, 21c, 21d lying in a nominal plane "P" and defining a planar trellis. After it has been wound, ring 10 is bent to place it onto the trellis in an alternately over-and under manner to frictionally engage each arm. In the illustrated four-arm structure, opposing sides of the ring are symmetrically bent out of the nominal plane to contact the arms. This securely positions the ring in the plane of the trellis, while permitting the ring to slide in that plane along the trellis arms to accommodate circumferential and diametral expansion of the ring. It will be understood that the mounting is not limited to a cross-like structure but may include a trellis with more projecting arms, or a hub and spoke framework with a large number of spokes, or other skeletal structure which frictionally engages the coil.

The use of such as frictionally engaging mounting structure effectively decouples the mounting structure from the ring, due to the limited contact area and the the sliding contact between each spoke and the ring. Localized stresses due to differential thermal expansion of the ring and the mounting thus lie below a threshhold determined by the force necessary to overcome friction at the points of contact of the ring and frame. The trellis 20 is preferably formed of an ultra low expansion glass, such as the "ULE" glass supplied by Hoya. Preferably, the mounting 20 and coil 10 are further placed in an isothermal environment to eliminate thermal gradients. This may be accomplished by mounting them within a thermally conductive casing, which is evacuated or is filled with a low conductivity medium.

Figure 4A:
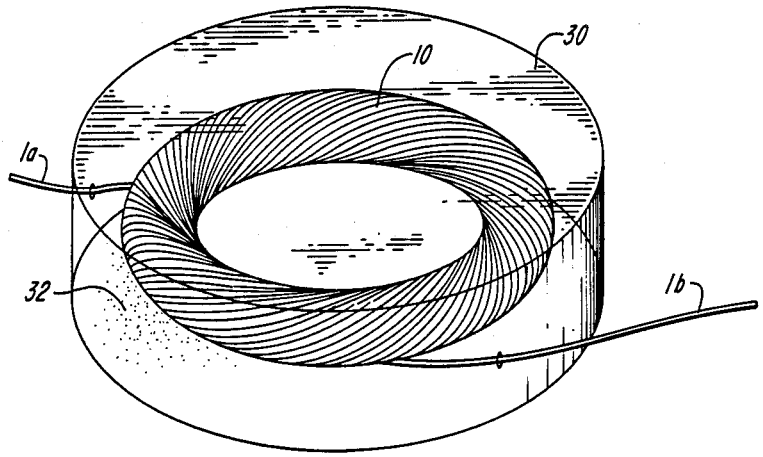
FIGS. 4A, 4B show the coil of FIGS. 2A, 2B in other mounting structures.

A second contemplated mounting structure for the ring 10 is a bouyant mounting. Such a mounting is illustrated in FIG. 4A, and includes a closed box or chamber 30 in which the coil 10 is placed. Box 30 has a shallow cylindrical shape which defines the desired planar orientation of the coil, and is essentially filled with microscopic beads illustrated in part at 32, formed of a material having a density equal to the mean density of the fiber material. In this embodiment, the coil is uniformly and bouyantly supported without localized frictional or external forces. The box dimension inhibits excessive motion of the fiber, preventing deleterious forces on the fiber ends 1a, 1b, and maintaining the desired planar orientation.

Figure 4B:
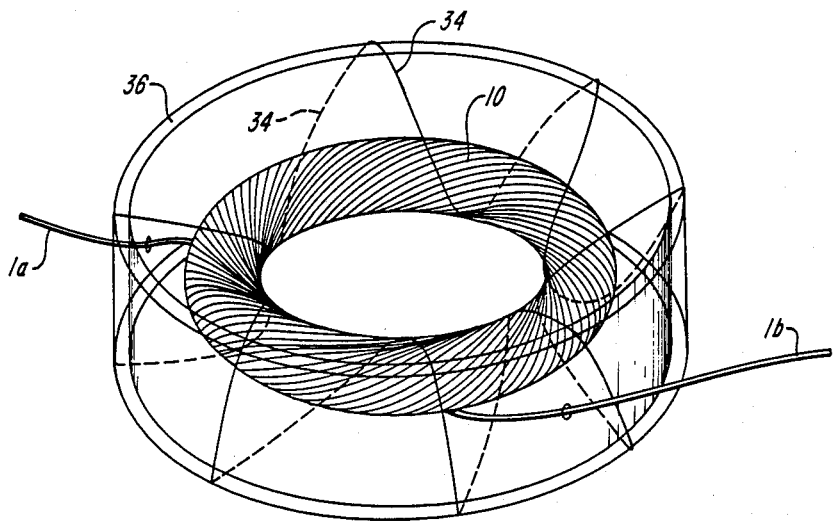

FIG. 4B shows another contemplated mounting structure. In this embodiment a plurality of filaments 34 extend from a frame structure 36 and suspend the ring 10 in a defined plane. The filaments, which may, for example, be carbon or the like, are oriented to cross the fiber windings at an angle, e.g., a right angle, so that they contact the fibers of the ring at a small number of isolated points. This suspension transmits little heat or stress to the ring, and allows deformation of the ring to accomodate changes in fiber tension.

The invention further contemplates a hybrid mounting structure incorporating the features of the trellis mounting 20 and the box mounting 30. In such a hybrid structure, not illustrated, the ring 10 is placed on a trellis mount 20 which is then rigidly supported in a defined orientation in a bead-filled box 30. This construction exhibits more precise control of the ring plane, while retaining the essential bouyant support and the sliding frictional support feature for eliminating differential thermal stress as in the previously described mountings.

While the described constructions will have utility in virtually all instruments wherein an optical coil is subjected to extreme temperatures, one particular application deserves special mention. It is known in the art to provide a polarizer which consists essentially of a single birefringent optical fiber wound into a coil which has been fabricated so as to effectively extinguish one polarization while efficiently transmitting the other polarization. The temperature range in which the necessary birefringence and the spread of polarization transmission efficiencies for achieving such polarization exists, is limited in part by mounting-induces stress effects. Accordingly, one particular contemplated application of the invention is the construction of a self-supporting fiber coil, as described above, wherein the fiber is a birefringent fiber and is of a length effective to pass light of one polarity input thereto, while extinguishing light of another polarity. A related contemplated application is the construction of a polarization-preserving self-supporting ring for a fiber optic ring gyro.

This completes a description of an optical fiber coil according to the invention, and of preferred coil mounting structures. It will be understood that the foregoing description is made to illustrate operative principals of the invention, and that the invention is not limited to the illustrated constructions but may take different forms. Other embodiments within the general scope of the invention will occur to those skilled in the art, and are included within the scope of the claims appended hereto.

What is claimed is:

1. An optical fiber coil forming an optical path for use in an instrument, such coil being characterized in that it comprises an unsupported fiber wound about itself along a defined curve such that mutual fiber-to-fiber contact of successive windings of said fiber maintain the coil in a self-supporting ring.

2. An optical fiber coil according to claim 1, wherein said fiber is spirally wound in a generally toroidal contour to form a substantially circular ring.

3. An optical fiber coil according to claim 2, further comprising support means for slideably frictionally supporting said circular ring in a defined plane.

4. An optical fiber coil according to claim 3, wherein said support means includes a substantially planar array of spokes for resiliently frictionally contacting said ring at discrete points to support the ring in a generally planar orientation.

5. An optical fiber coil according to claim 4, wherein said spokes extend in a plane from a central hub at regular angular intervals, and wherein said coil is placed symmetrically about said hub so as to contact successive ones of said spokes on opposing sides thereof, thereby effecting resilient frictional engagements therewith.

6. An optical fiber coil according to claim 3, wherein said support means is a trellis having a plurality of arms of a length such that the coil may be resiliently deformed and placed on said trellis in frictional engagement with said arms and supported thereby.

7. An optical fiber coil accoring to claim 1, further comprising
   a case defining an enclosure surrounding said coil and maintaining the coil in a defined orientation, and
   a medium substantially filling said case and having a density for bouyantly suspending said coil therein.

8. An optical fiber coil according to claim 7, further comprising frame means within said enclosure for frictionally supporting said coil in a plane.

9. An optical fiber coil according to claim 1, further comprising a frame and a filament suspending said coil from said frame in a defined plane.

10. An optical fiber ring of N loops, wherein a first plurality $j>1$ of said loops are untwisted, and a remainder $N-j$ of said loops are each wound $M>1$ times about a bundle consisting of the preceding loops so as to form a twisted fiber ring wherein frictional contact between loops of said fiber ring sustain the ring in a self-supporting coil structure.

11. An optical fiber coil comprising a single optical fiber having $N>2$ windings, including at least a first untwisted winding, and wherein for each $K>1$, the $K^{th}$ winding is wound in a loop with at least one crossing surrounding the preceding $K-1$ windings, said $K^{th}$ winding thereby having at least one twist corresponding to said crossing, and said windings together constituting a coil which is frictionally sustained in a generally toroidal ring by fiber-to-fiber frictional contact of said windings.

12. An optical fiber coil according to claim 11, wherein said fiber is a birefringent fiber of a length effective to extinguish light of one polarity while transmitting light of another polarity, and wherein said coil is wound about a diameter effective to preserve the fiber birefringence.

13. An optical fiber coil according to claim 11, wherein said fiber is a birefringent fiber having a different extinction coefficient for each polarization mode effective to polarize light injected into the fiber, and wherein said coil is wound about a diameter effective to substantially preserve said effective polarization property.

14. A method of making an optical fiber coil defining an optical path, such method comprising the step of winding an optical fiber in a plurality of loops, wherein successive loops are each cross wound at least once about all preceding loops to introduce a nominal restoring force, due to twist and spatial curving of the loop such that frictional contact between loops is effective to support said plurality of loops in a self sustaining ring.

15. The method of claim 14, further comprising the step of bending the coil to frictionally engage a substantially rigid support structure and support the coil in a fixed orientation.

16. The method of claim 14, further comprising the step of suspending the coil within a case.

17. The method of claim 16, wherein said case is operative to maintain the coil in a plane.

18. The method of claim 16, wherein the step of suspending includes suspending by a filament.

19. The method of claim 16, wherein the case contains material of a density for bouyantly supporting the coil.

20. The method of claim 14, further comprising the step of suspending the coil within an isothermal enclosure.

* * * * *

UNITED STATES PATENT AND TRADEMARK OFFICE
CERTIFICATE OF CORRECTION

PATENT NO. : 4,883,337
DATED : November 28, 1989
INVENTOR(S) : Robert P. Dahlgren It is certified that error appears in the above-identified patent and that said Letters Patent is hereby corrected as shown below:

At Column 5, line 31 delete "engagements" and insert --engagement--.

At Column 5, line 37 delete "accoring" and insert --according--.

Signed and Sealed this

Thirteenth Day of August, 1991

Attest:

HARRY F. MANBECK, JR.

Attesting Officer

Commissioner of Patents and Trademarks